W. L. LUCAS.
TRANSMISSION GEARING.
APPLICATION FILED OCT. 13, 1915.
1,185,417.
Patented May 30, 1916.
2 SHEETS—SHEET 1.
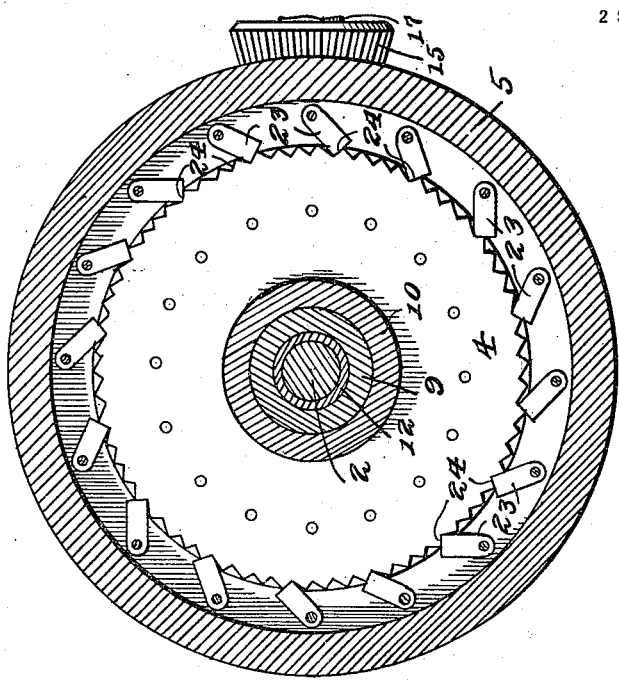
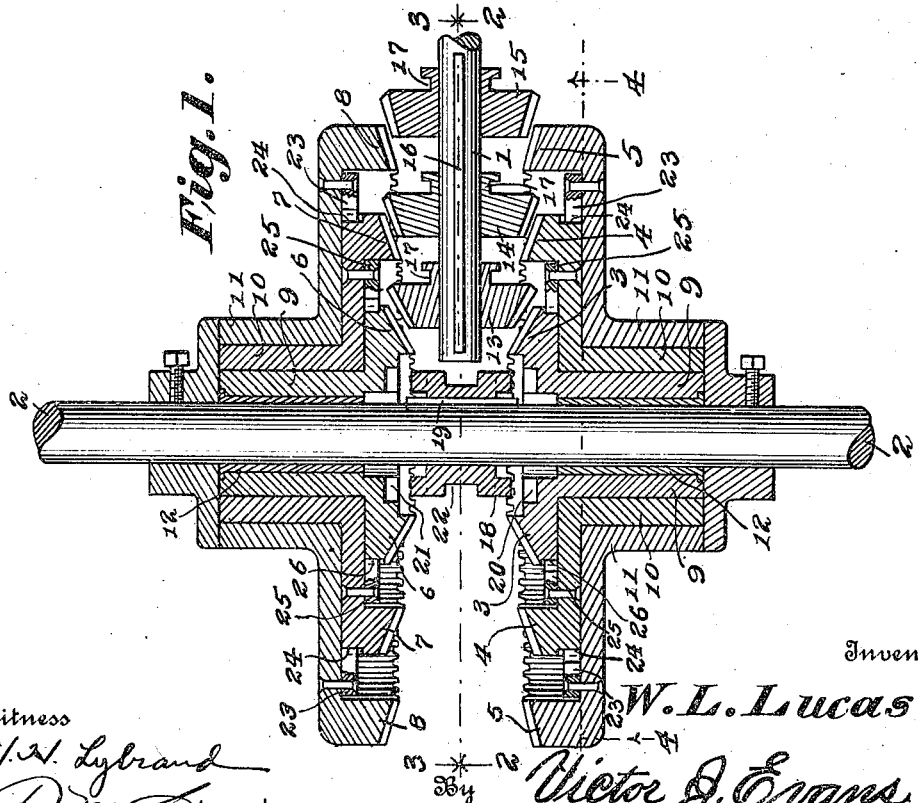
Witness
H. N. Lybrand
P. M. Smith.
Inventor
W. L. Lucas
By Victor J. Evans
Attorney

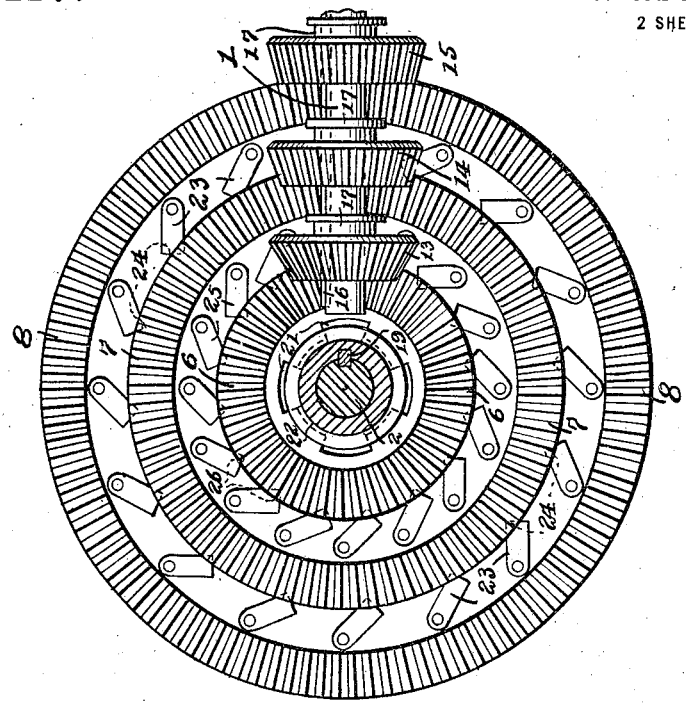

UNITED STATES PATENT OFFICE.

WYLLYS L. LUCAS, OF GEM, IDAHO, ASSIGNOR OF ONE-HALF TO CHARLES JACKSON, OF GEM, IDAHO.

TRANSMISSION-GEARING.

1,185,417.  Specification of Letters Patent.  Patented May 30, 1916.

Application filed October 13, 1915. Serial No. 55,712.

*To all whom it may concern:*

Be it known that I, WYLLYS L. LUCAS, a citizen of the United States, residing at Gem, in the county of Shoshone and State of Idaho, have invented new and useful Improvements in Transmission-Gearing, of which the following is a specification.

This invention relates to transmission gearing for automobiles and other motor vehicles, the object in view being to produce simple, compact and reliable changeable-speed gearing for transmitting the motion of the power shaft to another shaft to which the driving wheels are connected, whereby the driven shaft may be revolved at several different speeds relatively to the speed of the power or engine shaft, the shifting from one speed to another being effected in a simple manner with the minimum amount of physical effort and avoiding all possibility of stripping the teeth of the gears.

With the above and other objects in view, the invention consists in the novel construction, combination and arrangement of parts, as herein described, illustrated and claimed.

In the accompanying drawings: Figure 1 is a central section taken diametrically of the gears and showing the driving and driven shafts. Fig. 2 is a section at right angles to Fig. 1 taken about centrally thereof and looking in one direction. Fig. 3 is a similar view looking in the opposite direction. Fig. 4 is a section on the line 4—4 of Fig. 1.

Referring to the drawings 1 designates the driving shaft and 2 the driven shaft. Mounted on the driven shaft 2 are two opposed series of bevel gears, one series comprising the gears 3, 4 and 5 and the opposite series comprising the gears 6, 7 and 8. The gears of each series are of progressively increasing diameter from the shaft 2 outwardly. The inner gears or gears of smallest diameter are provided with the extended hollow hubs or bearings 9; the gears of next larger diameter are provided with hubs or bearings 10 which encircle the bearings 9 and the gears of largest diameter are provided with hubs 11 encircling and bearing upon the hubs 10. The inner or smaller gears 3 and 6 have their hubs 9 mounted to turn freely on a bushing 12 which surrounds and is loose upon the driven shaft 2. The driving shaft 1 has slidably mounted thereon bevel gears 13, 14 and 15 each of said gears being feathered to the shaft as shown at 16 in such manner that each of said gears may be shifted lengthwise of the driving shaft 1 independently of each other, each of the gears 13, 14 and 15 being shown as provided with a grooved hub 17 to be engaged by a shifting fork (not shown).

Mounted on the shaft 2 between the two series of gears on said shaft is a double faced clutch 18 which has a feathered connection with the shaft as shown at 19 whereby it is caused to rotate with the shaft 2 while being also adapted to be slid longitudinally of said shaft so that the opposite clutch faces thereof may be brought one at a time into engagement with corresponding clutch faces 20 and 21 on the inner faces of the gears 3 and 6 above referred to. The clutch 18 is shown as formed with a groove 22 to receive a shifting fork or lever.

Pivotally connected to the inner face of the larger gears 5 and 8 are dogs 23 which are adapted to engage teeth or notches 24 in the outer periphery of the adjacent gears 4 and 7, the dogs at one side being inclined reversely to those at the other side of the gearing. Other dogs 25 are pivotally mounted on the inner faces of the gears 4 and 7 and are adapted to engage notches or teeth 26 in the outer peripheries of the smaller gears 3 and 6 and like the dogs previously described are arranged to incline and work in opposite directions.

From the foregoing description, taken in connection with the accompanying drawings, it will now be understood that as the shaft 1 revolves, for example, at a constant speed, by shifting the gear 15 into engagement with the gears 5 and 8 and shifting the clutch 18 into engagement with the clutch face 20, the shaft 2 will be driven in a certain direction at a relatively slow rate of speed as compared with the speed of the shaft 1 thus producing what may be termed low speed. By shifting the clutch 18 in the opposite direction so as to engage the clutch face 21, the shaft 2 will be driven in the reverse direction at a corresponding speed. By shifting the gear 14 into engagement with the gears 4 and 7 while still leaving the gear 15 in engagement with the gears 5 and 8, and by shifting the clutch 18 into engagement with the clutch face 20, the shaft 2 will be driven at a higher rate of speed in a certain direction and by shifting the clutch 18 into engagement with the clutch face 21, the shaft 2 will be driven at the same speed but in the opposite direction. By then shifting the gear 13 into engagement with the gears 3 and 6, while leaving the gears 15 and 14 still in mesh with their respective gears on the shaft 2, and by shifting the clutch 18 into engagement with the clutch face 20, the shaft 2 will be driven at high speed in a certain direction, while by shifting the clutch 18 into engagement with the clutch 21, the shaft 2 will be driven at the same speed but in the opposite direction. Therefore, the changeable speed gearing hereinabove described provides for three speeds ahead and three speeds reverse. When the clutch 18 is shifted to a central or neutral position as shown in Fig. 1, the driving connection between the driving shaft 1 and the driven shaft 2 will, of course, be broken allowing the shaft 2 to stop. In returning from high speed to low speed either forward or reverse, the operation hereinabove described is merely reversed. The dogs 23 and 25 admit of relatively different speeds between the gears 3, 4 and 5 at one side and the gears 6, 7 and 8 at the other side of the driving shaft 1 thereby preventing the gears on the shaft 1 from locking the gears on the shaft 2 either when the gear 14 or the gear 13 is doing the actual driving.

Having thus described my invention, I claim:—

1. The combination with a driving shaft and a driven shaft perpendicular thereto, of a series of bevel gears rotating with and slidable independently on the driving shaft, a corresponding series of bevel gears normally loose on the driven shaft and having a loose bearing upon each other, the smallest gear of the last named series being provided with a clutch face, a clutch keyed to but slidable on the driven shaft and movable into and out of engagement with said clutch face, and one-way clutch mechanism between the gears of the second series.

2. The combination with a driving shaft and a driven shaft perpendicular thereto, of a series of bevel gears rotating with and slidable independently on the driving shaft, two series of gears mounted loosely on the driven shaft and having a loose mounting one upon the other, the said two series of gears being arranged at opposite sides of the first named series of gears on the driven shaft and the smallest gears of said two series being provided with clutch faces, a clutch keyed to and slidable longitudinally of the driven shaft and movable into and out of engagement with said clutch faces one at a time, and one-way clutch mechanism between the gears of the second series.

3. The combination with a driving shaft and a driven shaft perpendicular thereto, of a series of bevel gears rotating with and slidable independently on the driving shaft, a corresponding series of bevel gears normally loose on the driven shaft and having a loose bearing upon each other, the smallest gear of the last named series being provided with a clutch face, a clutch keyed to but slidable on the driven shaft and movable into and out of engagement with said clutch face, and dogs interposed between the gears of the second named series.

4. The combination with a driving shaft and a driven shaft perpendicular thereto, of a series of bevel gears rotating with and slidable independently on the driving shaft, two series of gears mounted loosely on the driven shaft and having a loose mounting one upon the other, the said two series of gears being arranged at opposite sides of the first named series of gears on the driving shaft and the smallest gears of said two series being provided with clutch faces, a clutch keyed to and slidable longitudinally of the driven shaft and movable into and out of engagement with said clutch faces one at a time, and dogs interposed between the gears of said two series.

In testimony whereof I affix my signature in presence of two witnesses.

WYLLYS L. LUCAS.

Witnesses:
JASPER H. BOOMER,
HARRY WILLIAMS.